Figure 1:
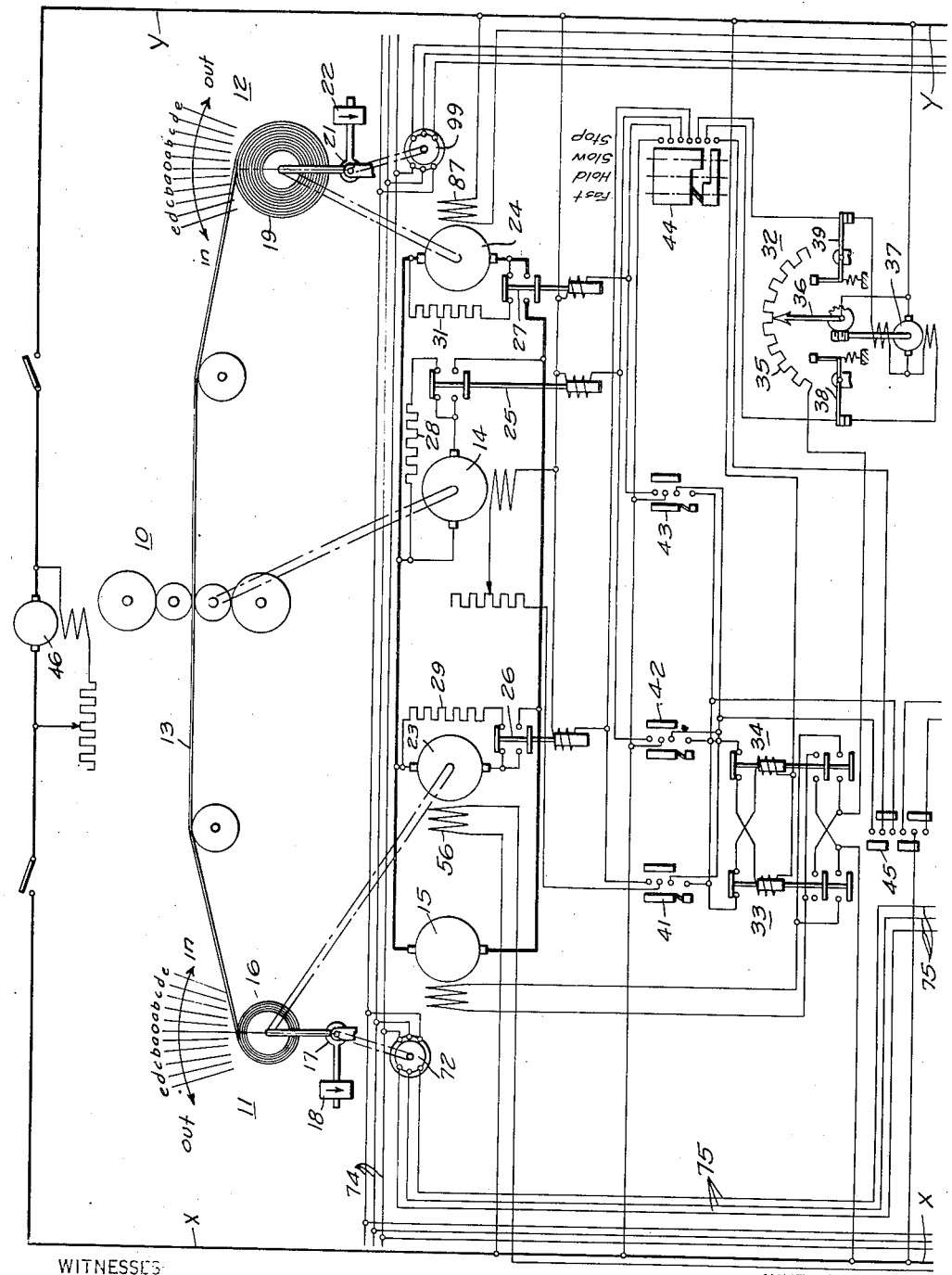

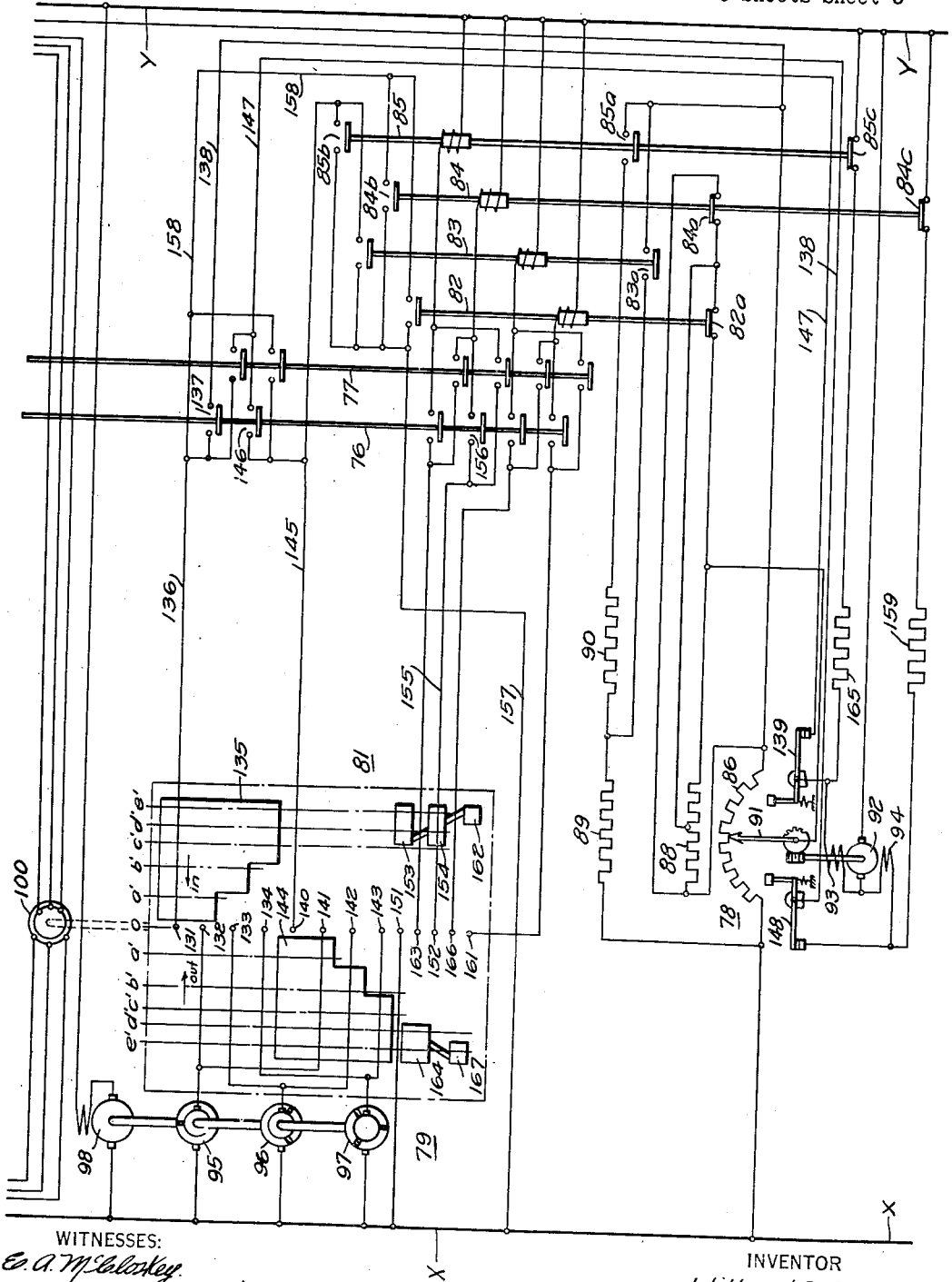

Patented June 13, 1939

2,162,527

UNITED STATES PATENT OFFICE 2,162,527

TENSION CONTROL SYSTEM

Willard G. Cook, Forest Hills, Pa., assignor to Westinghouse Electric & Manufacturing Company, East Pittsburgh, Pa., a corporation of Pennsylvania Application March 23, 1935, Serial No. 12,543

16 Claims. (Cl. 80—32)

My invention relates, generally, to electrical control systems and, more particularly, to systems for controlling and maintaining tension on material being worked by a mill or other work device.

In the working of various materials it has been found advantageous to subject the material whether it be metal, fiber, cloth, etc., to a predetermined amount of tension. The tension may be applied in the form of a back or retarding tension, or a pulling tension, or both kinds of tension may be applied at the same time, such for example, as in the operation of a reversible mill, or wire drawing machine, comprising a roll stand and reels on opposite sides thereof for winding-up and unwinding the material during the rolling process. However, it is desirable, if not necessary, in many instances, to be able to accurately adjust and maintain the desired tension at all times when needed. Heretofore, tension has been controlled by means of friction brakes and the like acting upon a reel or other device, mounted stationary with respect to the work device, which handles the material, or a dynamo-electric machine used either as a motor to subject the material to a pulling tension, or a braking generator to subject the material to a back tension. When using a dynamo-electric machine in this capacity with a reel or other work handling device which is stationary, the tension is controlled by controlling the torque of the machine in accordance with its load current by means of a regulator, for example.

It is an object of my invention, generally stated, to provide for controlling tension on material by subjecting a movable work handling device to a biasing force and maintaining the device at a predetermined operating position or within a predetermined operating range.

A more specific object of my invention is to provide for controlling the tension to which a material is subjected by means of a movable force-actuated work handling device and maintaining the device within a predetermined operating range by controlling the functioning of the braking or driving means for the device in accordance with its movements.

Another object of my invention is to provide for utilizing the movements of a movable tensioning device to maintain the device within a predetermined operating range for which it is adapted to maintain the desired tension.

A further object of my invention is to provide for controlling the functioning of a braking device or actuating device for a material handling reel in accordance with the position of the reel.

A still further object of the invention is to provide for utilizing the movements of a movable motor-actuated tensioning reel or device for controlling the speed of rotation of the reel.

The invention, accordingly, as shown in the accompanying drawings, comprises the structural features, combination of elements and arrangement of parts that will be exemplified in the structure and system hereinafter set forth and the scope of the application of which will be indicated in the claims.

Figure 2:
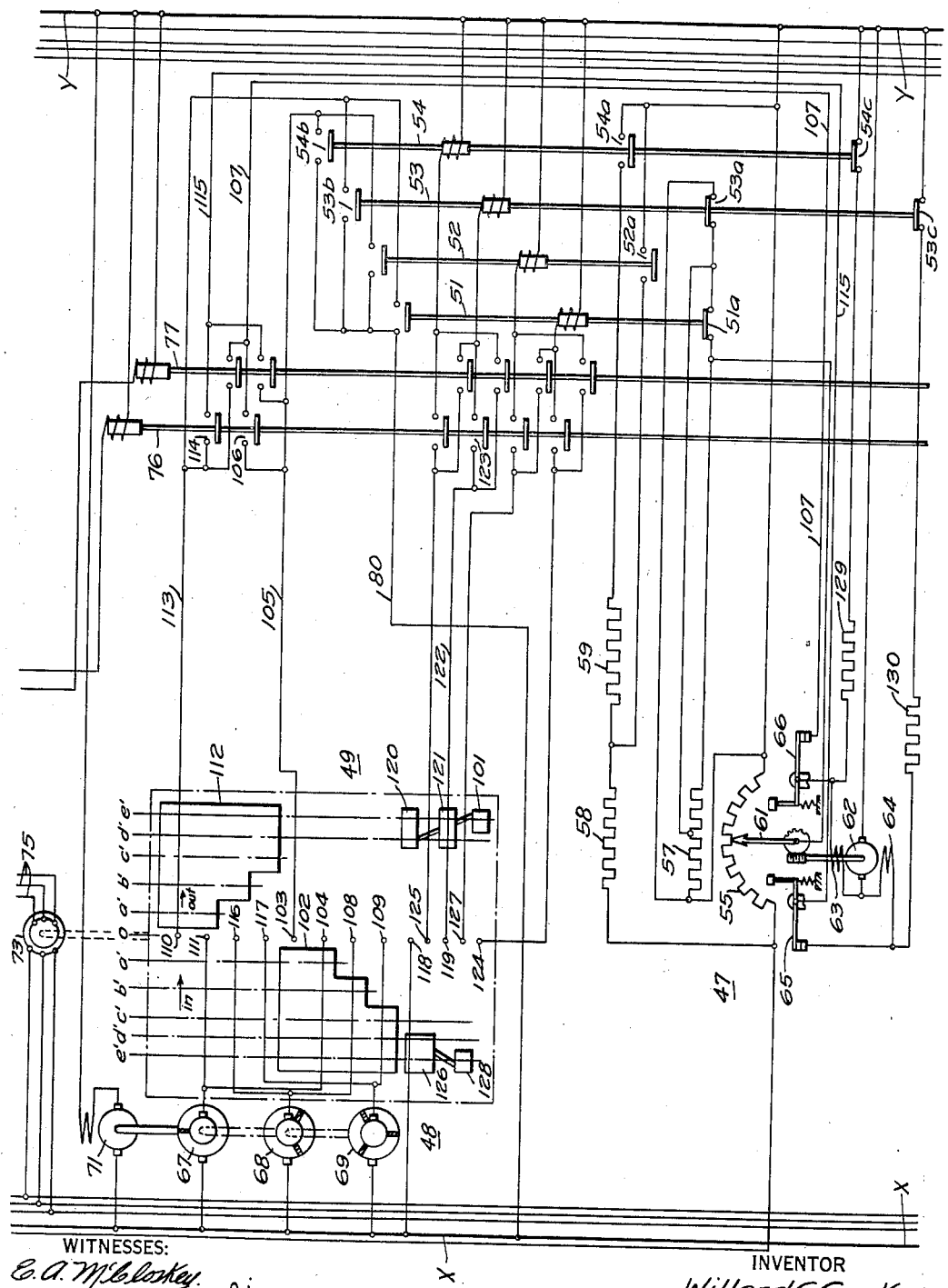

For a fuller understanding of the invention reference may be had to the following detailed description, taken in conjunction with the drawings, in which:

Figures 1, 2 and 3, taken together, constitute a diagrammatic illustration of a control system embodying the principal features of the invention.

In practicing my invention, as it may be applied to a rolling mill in which the work handling devices are in the form of movably-mounted reels biased in a tension producing direction by means of a constant force, I provide for controlling the functioning of the reel driving or braking means by means of a regulator device, the effectiveness of which is determined by the position of the reel. In other words, the reel may have a normal or "mean" operating position, which subjects the material to the desired constant tension. If the reel is exerting a pulling tension it will travel from the normal position in one direction if the driving force becomes too great, or in the opposite direction if the driving force becomes too small. This travel or movement of the reel may be utilized to control a regulator or other control device to control the driving force in a manner to maintain the reel at or near its normal operating position. If the reel is being utilized to exert a braking or back tension, its movements may likewise be used to control a regulator or other control device to control the braking force exerted on the unwinding reel.

In addition, I provide for rendering the degree of effectiveness of the regulator dependent upon the degree of deviation of the reel from its normal position.

Referring now to Figs. 1, 2 and 3 of the drawings, which are adapted to be placed in side-to-side relation in the order named to illustrate a complete exemplification of the invention, there is shown a rolling mill of the reversible type comprising a roll stand 10 and work handling reels 11 and 12 on opposite sides thereof, whereby the material 13 is unwound from one reel, passed through the rolls, and wound upon the opposite reel, and vice versa, until the rolling process is completed.

The roll stand 10 may be driven by a suitable motor 14 which receives variable voltage power from a main generator 15 which may be driven in any suitable manner.

The reels 11 and 12 are so constructed that the tension is applied to the material by means of a constant force acting to bias the reels in a direction to tension the material. As shown, reel 11 comprises a drum element 16 rotatably mounted on one arm of a pivoted supporting device 17 having a suitable weight 18 adjustably mounted on the other arm. Likewise, the reel 12 comprises a drum 19, supporting device 21 and weight 22.

While in this embodiment of the invention the reels 11 and 12 are illustrated as being movable by means of the pivotal mounting of the drum supports 17 and 21, it is to be understood that they may take other forms so long as they are moved in such direction as to tension the material by means of an external force, whether it be by means of a weight, fluid pressure, or otherwise.

As shown, the reels 11 and 12 have a zero position which may be termed their normal or "mean" position, and a plurality of abnormal positions, a, b, c, d, and e, on either side of the normal position which may be referred to as the "in" and "out" positions respectively.

The reels 11 and 12 may be controlled by means of dynamo-electric machines 23 and 24, which are mechanically connected to the drum elements as shown and which alternately function as generators and motors to brake or drive the reels, as the case may be, to cause the material to be subjected to the tension determined by the forces applied by the weights. It is apparent that a braking action on either reel may be produced by other means such, for example, as a Prony brake or the like.

The main motor 14 and reel motors 23 and 24 may be connected to the generator 15 by means of switches 25, 26 and 27, respectively, which function in their deenergized position to connect the motor armatures in series with the dynamic braking resistors 28, 29 and 31, respectively, in a well known manner.

The voltage of the generator 15 may be controlled in direction and amount by means of a motor-operated rheostat 32 and field reversing switches 33 and 34. The rheostat 32 comprises, generally, a resistance element 35 and a cooperating movable contact arm 36 actuated in either direction by means of a reversible motor 37. Limit switches 38 and 39, actuated by the arm 36, control the motor circuits to limit the movement of the arm.

In order to provide for controlling the operation of the motors and generators separately and collectively, a plurality of manual controllers 41, 42, 43 and 44 are provided. Controllers 41 and 43 control the operation of switches 26 and 27, respectively, to operate the reel motors independently of the roll stand. The operation of these controllers also operates the proper generator field switch 33 or 34 to cause the voltage applied to the motors to be in the desired direction. Controller 42 controls switch 25 to connect the mill motor to the generator and also operate the proper generator field switch. Controller 44 is the master controller which is utilized in conjunction with a direction controller 45 to operate the mill as a unit. The master controller has four positions, namely, stop, slow, hold and fast. When actuated to either the slow, hold or fast positions, the switches 25, 26 and 27 are energized to connect the reel and mill motors to the generator and one of the generator field switches 33 and 34, as determined by the setting of the direction controller 45, is also energized. If it is desired to increase the speed of the mill, the master controller is actuated to the "fast" position, which energizes the generator rheostat motor 37 in the proper direction over an obvious circuit to increase the excitation of the generator. When the desired speed has been reached, the controller may be actuated to the "hold" position to deenergize the rheostat motor 37 and the mill continues to run at this speed. In order to reduce the mill speed, the master controller is actuated to the "slow" position, which energizes the generator rheostat motor 37 in the opposite direction over an obvious circuit and the generator excitation is decreased. The decrease in speed is arrested by again actuating the controller to the "hold" position.

A source of constant voltage power 46 is provided for energizing the control conductors X and Y which supply the necessary current for energizing the field windings, operating relays, switches and the motor-operated devices of the system.

As shown in Fig. 1, the material 13 is wound upon the reel 12 and, therefore, the first operation is to pass the material through the roll stand 10, thereby causing the reel 12 to become the unwinding reel and the reel 11 to become the wind-up reel. In this instance, the dynamo-electric machine 23 functions as a motor to drive the drum 16 of the reel 11 and the machine 24 functions as a generator to brake the drum 19 of the reel 12.

In order to provide for maintaining the pulling tension exerted by the reel 11 and the back-tension exerted by the reel 12 at a substantially constant predetermined value, provision is made for controlling the functioning of the machines 23 and 24 in such manner as to maintain the reels as near as possible in their zero or mean positions, as shown. In the case of the wind-up reel 11, the speed of the motor 23 must vary in accordance with the amount of material wound upon the drum 16 and also in accordance with the linear speed of the material. The same is true of the unwinding reel 12. In the event that the speed of the material increases, the reel 11 tends to swing in the "out" direction and the motor speed must be increased, in order to return it to its "mean" position. Should the speed of the material 13 decrease, the reel will tend to move in the "in" direction and, therefore, the speed of the reel motor must be decreased. Likewise, in the case of the unwinding reel 12 when the speed of the material increases, the generator 24 must function to permit the reel to unwind at a faster rate. Otherwise, the reel is caused to move in the "in" direction. When the speed of the material decreases, the braking force exerted by the generator 24 must be increased in order that the reel may not swing in the "out" direction.

When either one of the machines 23 and 24 is functioning as a motor to drive its associated reel and the reel is caused to move in the "in" direction, the excitation of the motor must be increased a corresponding amount in order to reduce the winding speed. When the reel is caused to swing in the "out" direction, the excitation of the motor must be decreased in order to increase the winding speed. When the machines 23 and 24 are functioning as braking generators their excitation must be controlled in the opposite sense, that is, when the reel swings in the "in" direction, the excitation must be decreased, and when the reel swings in the "out" direction, the excitation must be increased.

In order to provide for controlling the functioning of the reel motors 23 and 24, to maintain their respective reels in or as near as possible to their "mean" positions, and to quickly return them to these positions, each motor is provided with a regulator system which is controlled in accordance with the movements of the reels.

The regulator system for the motor 23 is shown in Fig. 2 and comprises, generally, a motor-operated rheostat 47, a multi-contact circuit closer 48, a limit switch 49 and a plurality of control switches 51, 52, 53 and 54.

The rheostat 47 comprises a main resistance element 55, which is connected in series with the field winding 56 of the reel motor 23 across the supply conductors X and Y, and a plurality of auxiliary resistance elements 57, 58 and 59. The movable contact element 61 is actuated by a reversible motor 62 provided with a plurality of field windings 63 and 64. The limit switches 65 and 66 are provided for limiting the movement of the contact element 61.

In this instance, the energization of the rheostat motor 62 is controlled throughout a predetermined portion of the range of movement of the reel in both the "in" and "out" directions by means of the circuit closer 48. This device comprises a plurality of contact making elements 67, 68 and 69, which are actuated at a substantially constant speed by a motor 71 connected across the conductors X and Y as shown. The device 48 is so constructed that the contact element 67 closes the circuit once for every revolution, the contact element 68 twice for each revolution and contact element 69 three times for each revolution, corresponding to either the "in" or "out" a, b or c positions of the reel 11.

In order to provide for rendering the contact making device 48 effective to control the rheostat motor 62 in accordance with the position of the reel, the limit switch 49 is so constructed that it has positions in the "in" and "out" directions designated by a', b' etc. corresponding to the "in" and "out" positions of the reel.

The limit switch 49 may be actuated in accordance with the movements of the reel in any suitable manner, such for example, as by means of the position transmitting system comprising a transmitter 72 and a receiver 73 having their stator windings connected to a common three-phase source 74 and their rotor windings connected together by means of conductors 75 in a well-known manner, so that the movements of the limit switch correspond to those of the reel.

While the particular kind of a regulator system illustrated is believed to be a preferred type, it is to be understood that other forms of regulators, such for example, as a vibrating regulator controlled in accordance with the movements of the reel, may be used to equal advantage. Furthermore, regardless of the type of regulator used it may be actuated or controlled by connecting it directly to the reel or it may be remotely controlled by a position transmitting system as shown.

As referred to hereinbefore, the manner in which the excitation of the reel motors 23 and 24 must be controlled depends upon whether or not they are functioning as motors or generators. Therefore, in order that a single regulator or regulating system may function to control these motors under both conditions, provision is made for reversing the effect of the regulator system upon the field windings depending upon the function to be performed. In this instance, direction switches 76 and 77 are provided, and are controlled by means of the direction controller 45 which, in addition, functions to render the proper one of the generator field reversing switches 33 and 34 responsive to the operation of the master controller 44.

The regulator system for the reel motor 24 is shown in Fig. 3 and also comprises a motor-operated rheostat 78, a multi-contact circuit closer 79, a limit switch 81 and a plurality of control switches 82, 93, 84 and 85. The motor-operated rheostat 78 comprises a main resistance element 86 which is connected in series with the field winding 87 of the motor 24 across the supply conductors X and Y, and a plurality of auxiliary resistors 88, 89 and 90. The movable contact element 91 is actuated by a motor 92 having field windings 93 and 94.

The construction of the circuit closer 79 is the same as that described hereinbefore, and comprises, generally, the contact elements 95, 96 and 97, which are actuated by means of a motor 98. The movements of the limit switch 81 are controlled by means of a position transmitting system comprising the transmitter 99 and receiver 100.

Assuming that the mill has been set in operation by actuating the master controller 44 and the direction controller 45, it will be apparent that the movements of the reels 11 and 12 will be immediately transmitted to their respective limit switches 49 and 81. In the event that the reel 11 is moved to the "a" position in the "in" direction, the corresponding movement of the limit switch 49 to the "a" position causes contact fingers 103 and 104 to be bridged by the segment 102, thereby connecting the contact element 67 of the circuit closing device 48 in series with the rheostat motor 62. This circuit extends from the contact finger 103, through conductor 105, contact members 106 of the direction switch 76, which is now closed, conductor 107, limit switch 66, field winding 63, and armature of the motor 62, to conductor Y. This causes the motor 62 to actuate the rheostat 47 in such direction as to decrease the field resistance and thereby decrease the motor speed.

In the event that the reel 11 continues to move in the "in" direction to the "b" position, contact finger 108 is next engaged by the segment 102, which connects the contact element 68 to the energizing circuit for the rheostat motor 62. In this instance, for each revolution of the circuit closer 48 the rheostat motor 62 receives three impulses of current. Should the reel continue to move in the "in" direction to the "b" position, contact member 109 is engaged by the segment 102, thereby connecting the contact element 69 to the energizing circuit for the rheostat motor 62 which now receives six impulses of current for each revolution or cycle of operation of the circuit closer 48.

The limit switch 49 functions to control the operation of the rheostat motor 62 in the opposite manner in the event that the reel 11 swings in the "out" direction. Thus, in the "a" position in the out direction, the contact fingers 110 and 111 are bridged by the segment 112 to connect the contact element 67 through conductor 113, contact members 114 of the direction switch 76, conductor 115, limit switch 65 and field winding 64 to the armature of the motor 62. As will be readily understood, this provides for actuating the rheostat in the opposite direction, which is necessary in order to decrease the excitation of the motor and thereby increase its speed. As the reel continues to swing in the "out" direction to positions "a" and "b", contact fingers 116 and 117 are bridged successively to connect the contact elements 68 and 69 to this circuit.

In order to quickly restore the reels to their "mean" positions in the event that they swing beyond the "c" positions in either direction, provision is made for causing the motor-operated rheostats 47 and 78 to run continuously at an increased speed in the desired direction, and in addition, provision is made for modifying the resistance characteristics of the rheostats.

During the operations described hereinbefore, the control switches 51 through 54 in Fig. 2 were deenergized. The switches 51 and 53 are provided with normally closed back contact members 51a and 53a, which short circuit the resistance element 57 which is connected in series with the movable contact element 61 of the rheostat, and therefore, this resistor is ineffective. The resistors 58 and 59 are controlled, respectively, by the contact members 52a and 54a of the control switches 52 and 54, these contacts being open to render these resistors likewise ineffective.

Since the resistor 57 is connected in series with the movable contact element 61, it is apparent that it may be utilized to greatly increase the effective resistance of the rheostat. The resistors 58 and 59 are connected in parallel with the main resistor element 55, and, therefore, may be used to greatly decrease the effective resistance of the rheostat.

In order to describe the manner in which these resistors may function, it may be assumed that the reel 11 moves to the "d" position in the "out" direction. This causes the contact fingers 118 and 119 of the limit switch 49, to be bridged by the connected segments 120 and 121, to establish an energizing circuit for the control switch 53 which extends through the conductor 122 and contact member 123 of the direction switch 76. The closure of control switch 53 causes its contact members 53a to open, which connects a portion of the resistor 57 in series with the movable contact element 61 of the rheostat, thereby increasing the effective resistance of the rheostat. In addition, contact members 53b are closed to connect the conductor 115 directly to the supply conductor X through contact members 114 and conductor 80, thereby shunting the multi-contact circuit closer 48 and connecting the rheostat motor 62 directly across the line conductors X and Y, which causes the rheostat 47 to move continuously in a direction to increase its effective resistance. Contact members 53c open to disconnect the shunting resistor 130 to increase the speed of the rheostat motor 62.

It is apparent that these operations quickly decrease the excitation of the reel motor 23 and thereby quickly return the reel to the "mean" position.

In the event that the reel swings to the "e" position in the "out" direction, the contact finger 124 of the limit switch 49 is bridged by segments 120 and 101, thereby establishing an energizing circuit for the control switch 51. Upon the operation of this switch, its contact members 51a are opened to connect the remainder of the resistor 57 in the rheostat circuit, thereby furthere increasing the effectiveness of the rheostat 47.

In the event that the reel 11 swings to the "d" position in the "in" direction contact finger 125 is bridged by the segment 126 and the control switch 54 operated to close its contact members 54a and 54b. The closure of contact members 54a connects both of the resistors 58 and 59 in parallel with the main resistance element 55, thereby decreasing the effective value of the rheostat. The closure of contact members 54b connects conductor 107 directly to conductor X and the rheostat motor 62 runs continuously in a direction to decrease the effective resistance of the rheostat. If the reel swings to point "e" in the "in" direction, contact finger 127 is bridged by the segment 128, to energize the control switch 52, thereby closing its contact members 52a, which short circuits the resistor element 59 leaving the element 58 connected in parallel with the resistor 55 thereby further decreasing the effective resistance of the rheostat 47. Contact members 54c are opened to disconnect resistor 129 to increase the speed of the rheostat motor 62.

The operation of the apparatus shown in Fig. 3 which controls the reel motor 24, which is now functioning as a generator, functions in exactly the same manner as the equipment shown in Fig. 2, except that the excitation of the generator 24 is controlled in the opposite sense to that of the motor 23.

When the reel 12 swings through the positions, a, b and c in the "in" direction, the contact elements 95, 96 and 97 of the circuit closer 79 are successively connected through the contact fingers 131, 132, 133 and 134, and the segment 135 of the limit switch 81, conductor 136, contact members 137, conductor 138, limit switch 148, and the field winding 94 to the armature of the motor 92, thereby causing the motor-operated rheostat to decrease the excitation of the generator.

In the event that the reel swings through the positions a, b and c in the "out" direction, the contact elements 95, 96 and 97 are connected through contact fingers 140, 141, 142 and 143, segment 144, conductor 145, contact members 146, conductor 147, limit switch 139 and field winding 93 to the armature of the motor 92, thereby causing the rheostat to be actuated in the opposite direction to increase the excitation of the generator.

As in the case of the regulator shown in Fig. 2, further movement of the reel in either direction to the "d" and "e" positions effects the operation of the control switches 82 through 85 to control the effectiveness of the auxiliary resistors 88, 89 and 90 to further modify the functioning of the rheostat 78.

The movement of the reel 12 to the "d" position in the "in" direction causes the contact fingers 151 and 152 of the limit switch 81 to be bridged by segments 153 and 154 to establish a circuit through conductor 155 and contact members 156 for operating the control switch 84. The closure of switch 84 effects the opening of its contact members 84a to connect one section of the resistor 88 in series with the movable contact 91 of the rheostat thereby increasing the effective value of its resistance. This reduces the excitation of the generator. The closure of contact member 84b connects the rheostat motor 92 directly across conductors X and Y through conductors 157 and 158 and contact members 137 to cause the continuous operation of the rheostat 78 in a direction to further decrease the excitation of the braking generator 24. In addition, the opening of contact members 84c renders the resistor 159, normally connected in parallel with the rheostat motor 92, ineffective which increases the speed of the motor.

In the event that the reel 12 moves to the "e" position in the "in" direction, the limit switch contact finger 161 is engaged by the segment 162 to effect the closure of control switch 82. Its contact members 82a open to connect the remainder of the resistor 88 in the rheostat circuit to further decrease the excitation of the braking generator.

When the reel 12 moves to position "d" in the "out" direction, limit switch contact fingers 151 and 163 are bridged by segment 164 to operate control switch 85 which closes its contact members 85a to connect resistors 89 and 90 in parallel with the main resistor element 86 of the rheostat to increase the excitation of the braking generator 24. In addition, contact members 85b are closed to connect the rheostat motor 92 directly across the supply conductors X and Y through conductor 157, contact members 146 and conductor 147, to cause the rheostat to operate continuously in a direction to further increase the excitation of the braking generator. Contact members 85c also open to disconnect resistor 165 and increase the speed of the rheostat motor.

Further movement of the reel 12 to position "e" in the "out" direction causes the contact finger 166 of the limit switch to be engaged by segment 167 to operate the control switch 83 which, at contact members 83a, shunts resistor 90 and further increases the excitation of the braking generator.

In order to reverse the operation of the mill the direction controller 45 is actuated to the opposite position, thereby rendering the other one of the field reversing switches 33 and 34 responsive to the master controller 44, and de-energizing the direction switch 76 and energizing the direction switch 77. As will be readily understood, the closure of the direction switch 77 merely reverses the direction in which the motor-operated rheostats 47 and 78 are connected to the multi-contact circuit closers 48 and 79 through their respective limit switches, so that in this instance, the regulating system associated with the reel 11 functions to control the machine 23 as a generator instead of a motor, and the regulating system associated with reel 12 controls the machine 24 as a motor.

In view of the foregoing, it will be readily understood that I have provided a regulating system for maintaining tension in the operation of rolling mills and similar devices which is simple and of rugged construction, and which is well suited for applications of this kind. The invention provides for maintaining a substantially constant predetermined tension regardless of the speed of the mill or the amount of material contained on the reel at any time. The tension which is maintained is not a function of the load on the mill motor or the reel motor but, instead, is maintained by a constantly applied force which is not in any way affected by rolling conditions.

While I have shown and described a particular embodiment of my invention, it will be obvious to those skilled in the art that changes and modifications may be made within the scope of my invention and I, therefore, aim for the appended claims to cover all such changes and modifications that fall within the true spirit and scope of my invention.

I claim as my invention:

1. In combination, a reeling device for moving material comprising a reel rotatably mounted on a movable support having a predetermined normal operating position and means for biasing the support to subject the material to a substantially constant tension, a dynamo-electric machine connected to the reel for retarding it when unwinding and driving it when winding, and continuously-operating regulator means variably responsive to the degree of movement of the reeling device from its normal operating position for controlling the excitation of the dynamo-electric machine, whereby the reel is maintained in a predetermined operating position regardless of changes in the speed of the moving material.

2. A strip mill for rolling flexible material having in combination, a roll stand and reels on opposite sides thereof, said reels being mounted for movement toward and away from the roll stand and biased by a constant force to subject the material between the roll stand and reels to a substantially constant tension, a dynamo-electric machine connected to each reel alternately disposed to function as a braking generator or a motor depending on the direction of movement of the strip through the mill, means for controlling the excitation of each dynamo-electric machine, and continuously-operating regulator means controlled in accordance with the movements of the reels for controlling the operation of the excitation controlling means, whereby the driving or retarding force, as the case may be, exerted by the dynamo-electric machines, is so regulated as to maintain the reels in predetermined positions.

3. In combination, a winding reel for handling strip material, mounting means for the reel whereby the material is subjected to a substantially constant tension, said mounting means being movable from a predetermined mean position to other positions on opposite sides thereof, a dynamo-electric machine disposed to function as a generator to retard the rotation of the reel or as a motor to drive it dependent on whether the reel is unwinding or winding the material, and electro-responsive means for varying the degree of excitation of the dynamo-electric machine, and means for controlling the electro-responsive means in accordance with the degree of movement of the reel from the predetermined mean position.

4. In combination, a roll stand for working moving material, winding reels on opposite sides thereof for alternately winding up and unwinding the material as it is passed back and forth through the mill, each of said reels comprising a movably-mounted winding element having a mean operating position and biased by a constant force to subject the material to a substantially constant tension, a dynamo-electric machine connected in driving relation to each winding element disposed to alternately function as motors and braking generators dependent upon the direction of movement of the material, electrically operated regulator means for controlling the excitation of each dynamo-electric machine, and means responsive to the position of the winding element with respect to the mean operating position for controlling said excitation controlling means.

5. In combination, a roll stand for working moving material, winding reels on opposite sides thereof for alternately winding up and unwinding the material as it is passed back and forth through the mill, each of said reels comprising a movably-mounted winding element having a normal operating position and biased by a constant force to subject the material to a substantially constant tension, a dynamo-electric machine connected in driving relation to each winding element disposed to alternately function as motors and braking generators dependent upon the direction of movement of the material, a motor-operated rheostat for controlling the excitation of each dynamo-electric machine, and means including an electrically-operated switching device for controlling the operation of the motor-operated rheostats in accordance with the position of the winding element with respect to its normal operating position.

6. In combination, a roll stand for working moving material winding reels on opposite sides thereof for alternately winding up and unwinding the material as it is passed back and forth through the mill, each of said reels comprising a movably-mounted winding element biased by a constant force to subject the material to a tension, a dynamo-electric machine connected in driving relation to each winding element disposed to alternately function as motors and braking generators dependent upon the direction of movement of the material, electro-responsive means for controlling the excitation of each dynamo-electric machine, continuously-operating means for controlling the energization of each electro-responsive means, and switch means actuated in accordance with the position of the winding elements for selectively connecting the electro-responsive devices to their associated switch means.

7. The combination with a work device for working moving material, of a work handling device for subjecting the moving material to a tension, said device comprising a rotatable element mounted for movement toward and away from the work device and biased by a constantly applied force, electro-responsive means for controlling the speed of rotation of the rotatable element, an electrically-operated rheostat for controlling the functioning of the electro-responsive means, and continuously-operating means including a switching device controlled in accordance with the movements of the rotatable element for variably controlling the speed and direction of operation of the rheostat.

8. The combination with a work device for working moving material, of a work-handling device associated therewith for subjecting the moving material to a tension, said work-handling device comprising a movably-mounted winding element biased by a constant force in a direction to tension the material, a dynamo-electric machine connected in driving relation to the winding element, a motor-operated rheostat for controlling the excitation of the dynamo-electric machine, a motor-operated interrupter for controlling the energization of the motor-operated rheostat, and switch means actuated in accordance with the movements of the winding element for selectively connecting the motor-operated rheostat to the interrupter dependent upon the direction of movement of the winding element.

9. The combination with a work device for working moving material, of a work-handling device associated therewith for subjecting the moving material to a tension, said work-handling device comprising a movably-mounted winding element biased by a constant force in a direction to tension the material, a dynamo-electric machine connected in driving relation to the winding element, electro-responsive means for controlling the excitation of the dynamo-electric machine, a continuously-operating circuit interrupter having a plurality of control elements each disposed to maintain a circuit energized for different lengths of time, and means actuated in accordance with the position of the winding element for selectively connecting the electro-responsive means to the control elements of the interrupter.

10. The combination with a roll stand for working strip material, of movably mounted winding reels on opposite sides thereof for alternately winding and unwinding material as it is passed in opposite directions through the roll stand, means for exerting a constant biasing force on the reels to tension the material, a motor connected to each reel disposed to alternately function as motors and generators dependent upon the direction of movement of the material, a motor-operated rheostat for controlling the excitation of each motor, a motor-operated circuit interrupter for variably controlling the energization of each motor-operated rheostat, and means operable in accordance with the movement of each reel for varying the effectiveness of each circuit interrupter dependent upon the degree of movement of the reels, thereby to provide for varying the excitation of the reel motors to such a degree and at a rate corresponding to the amount of movement of the reels from a normal operating position.

11. The combination with a roll stand for working strip material, of movably mounted winding reels on opposite sides thereof for alternately winding and unwinding material as it is passed in opposite directions through the roll stand, means for exerting a constant biasing force on the reels to tension the material, a motor connected to each reel disposed to alternately function as motors and generators dependent upon the direction of movement of the material, electro-responsive means for controlling the speed of each motor, a multi-element contactor device for variably controlling the energization of the electro-responsive speed controlling means, switching means operable to selectively connect the various elements of the contactor device to the electro-responsive means, and means for actuating the switching means in accordance with the movements of their respective reels.

12. The combination with a work device for producing translatory motion of a length of material, of a reel, means for supporting the reel for movement toward and away from the work device, said supporting means having a normal operating position and being subjected to a constant biasing force to subject the material to a substantially constant tension, a dynamo-electric machine connected in driving relation to the reel, an electrically-operated rheostat for controlling the excitation of the dynamo-electric machine, electro-responsive means controlled by the movements of the reel supporting means for controlling the operation of the rheostat, said means being ineffective to change the speed of the dynamo-electric machine when the reel supporting means is in the normal operating position and being operable to vary the speed of said dynamo-electric machine to a varying degree dependent upon the amount of movement of the reel supporting means from its normal operating position.

13. The combination with a work device for working moving material, of a work-handling device associated therewith for subjecting the moving material to a tension, said work-handling device comprising a movably mounted winding element biased by a constant force to tension the material, a dynamo-electric machine connected in driving relation to the winding element, electro-responsive regulator means for controlling the speed of the dynamo-electric machine, and means including an electrical position-transmitting system for controlling the operation of the regulator means in accordance with the movements of the work-handling device, whereby the speed of the winding element is so controlled as to cause the work handling device to be maintained within a predetermined range of movement.

14. The combination with a work device through which material to be worked is passed, of a winding reel for receiving the material, said reel comprising a rotatable drum element mounted for movement with respect to the work device throughout a predetermined range, means for applying a constant force tending to move the reel away from the work device to tension the material, a motor for driving the drum element, means operable to vary the speed of the reel motor, said means being adapted to effect a variable rate of change in the motor speed, and an electrical position-transmitting system interposed between the reel and said speed controlling means for causing said speed controlling means to function in accordance with the position of the reel with respect to the work device.

15. The combination with a work device for working moving material, of a reel element supported by a movably mounted device for handling the material, said supporting device being biased by a constantly applied force in a direction to subject the material to a substantially constant tension and having a normal operating position, electro-responsive means for controlling the speed of the reel element, continuously-operating regulator means for controlling the speed of the electro-responsive means, said regulator means being operable to effect varying degrees of speed change of the electro-responsive means, and means responsive to the movements of the supporting device relative to its normal operating position for controlling the continuously operating regulator means, thereby to cause said regulator device to effect varying degrees of speed change of the electro-responsive means in accordance with the degree of movement of the supporting device from its normal operating position.

16. The combination with a work device for working moving material, of a reel for handling the material, means for supporting the reel for movement toward and away from the work device to subject the material to a substantially constant tension, said supporting means having a mean operating position and a predetermined range of movement on opposite sides thereof, a dynamo-electric machine connected in driving relation with the reel, a variable speed electro-responsive regulator device for controlling the excitation of the dynamo-electric machine, and means controlled in accordance with the movements of the reel supporting means for controlling the speed of operation of the regulator device to varying degrees in accordance with the degree of movement of the said reel supporting means, thereby to provide for modifying the speed of the dynamo-electric machine in varying degrees dependent upon the position of the reel supporting means relative to its mean operating position.

WILLARD G. COOK.